United States Patent [19]
Arai

[11] Patent Number: 5,183,991
[45] Date of Patent: Feb. 2, 1993

[54] METHOD OF WELDING GALVANIZED STEEL SHEETS WITH A LASER BEAM

[75] Inventor: Takeji Arai, Iruma, Japan

[73] Assignee: Fanuc Ltd, Minamitsuru, Japan

[21] Appl. No.: 720,848

[22] PCT Filed: Nov. 9, 1990

[86] PCT No.: PCT/JP90/01464

§ 371 Date: Jul. 15, 1991

§ 102(e) Date: Jul. 15, 1991

[87] PCT Pub. No.: WO91/07250

PCT Pub. Date: May 30, 1991

[30] Foreign Application Priority Data

Nov. 22, 1989 [JP]  Japan .................................. 1-304328

[51] Int. Cl.⁵ .............................................. B23K 26/00
[52] U.S. Cl. ............................ 219/121.64; 219/121.84
[58] Field of Search ..................... 219/121.63, 121.64, 219/121.82, 121.84

[56] References Cited

U.S. PATENT DOCUMENTS 3,969,604  7/1976  Baardsen ............................. 219/121
4,642,446  2/1987  Pennington ..................... 219/121.64
4,873,415 10/1989  Johnson et al. ................. 219/121.64

OTHER PUBLICATIONS

Patent Abstracts of Japan, vol. 9, No. 63 (M-365)[1786], Mar. 20, 1985; & JP-A-59 197 390 (Toshiba K.K.) (Aug. 11, 1984) * Abstract *.

*Primary Examiner*—C. L. Albritton
*Attorney, Agent, or Firm*—Staas & Halsey

[57] ABSTRACT

Galvanized steel sheets or a galvanized steel sheet and a sheet of another metal are welded to each other by a laser beam. An intermediate layer for suppressing evaporation of zinc is formed between the galvanized steel sheets (1, 4) or the galvanized steel sheet (1) and the sheet of another metal. A laser beam (8) is applied to the galvanized steel sheet (1) or the sheet of another metal, thereby welding the sheets with the laser beam. As a result, porosity is prevented from being formed in a weld bead (9), and the weld bead (9) has a constant width.

6 Claims, 2 Drawing Sheets

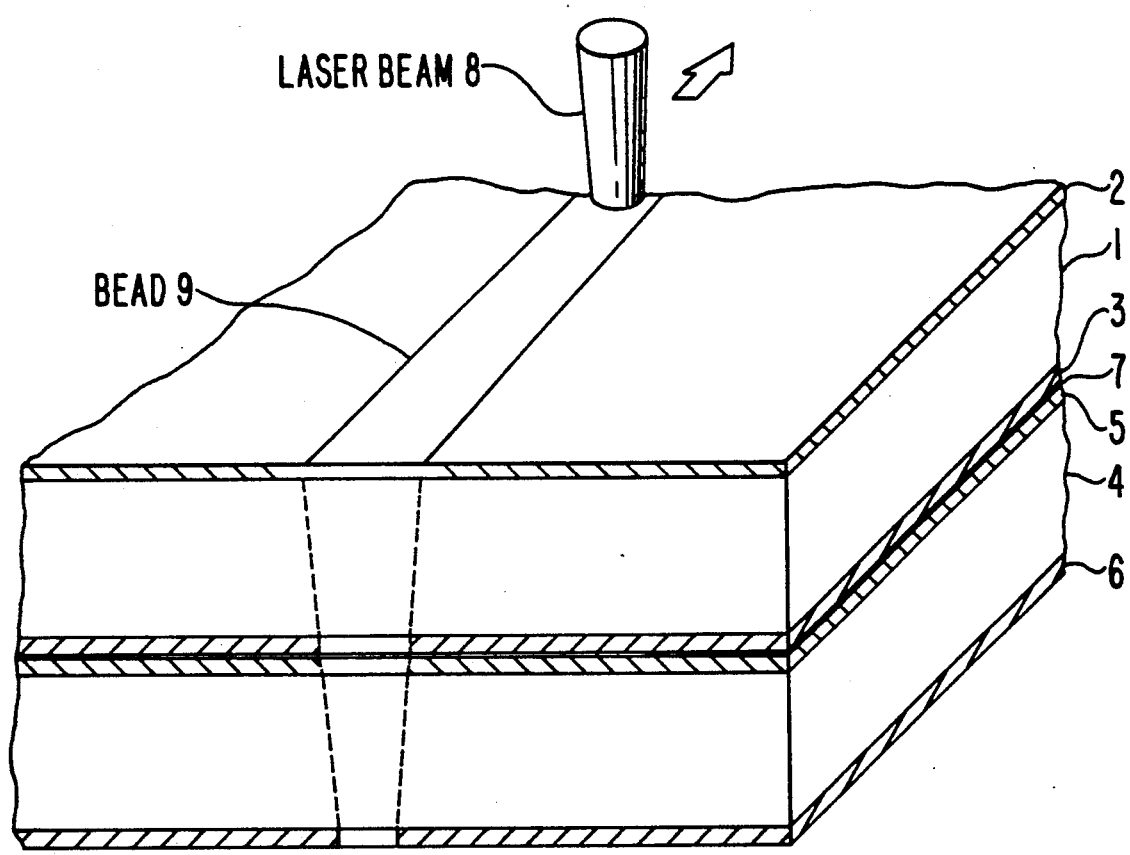

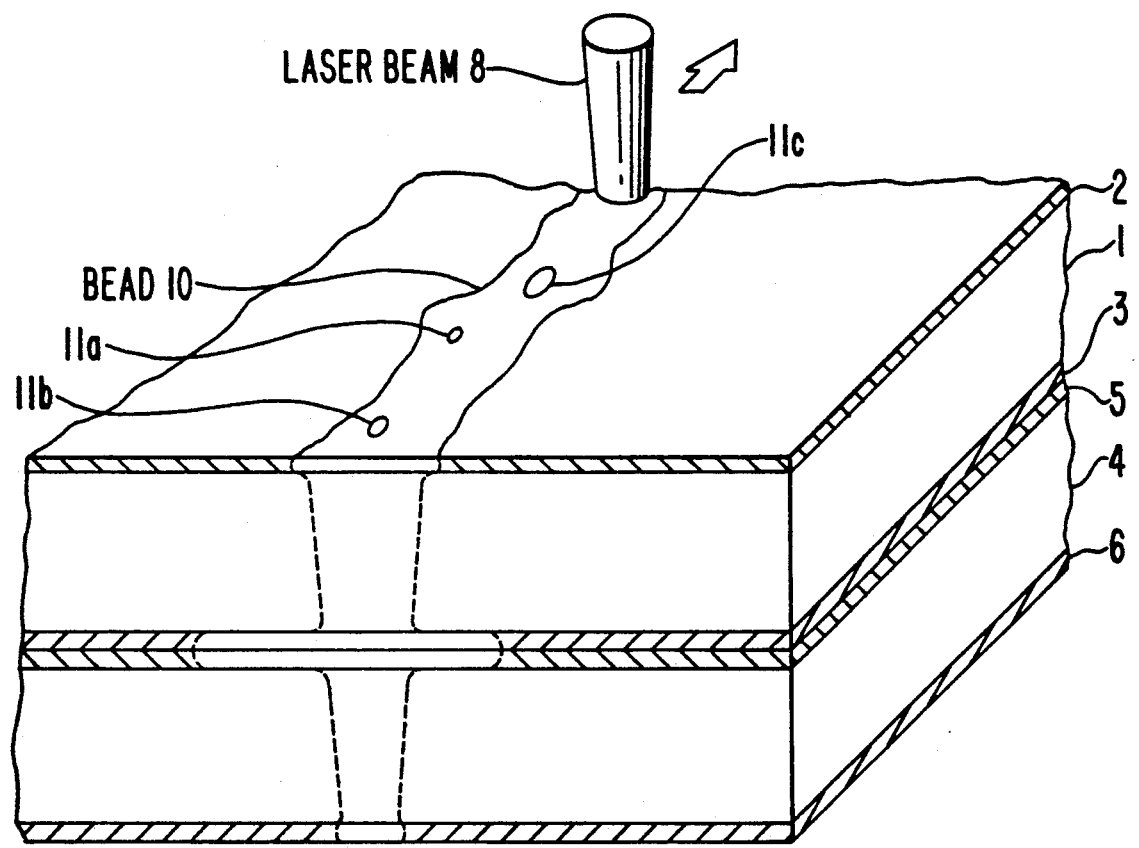

METHOD OF WELDING GALVANIZED STEEL SHEETS WITH A LASER BEAM

TECHNICAL FIELD

The present invention relates to a method of welding a galvanized steel sheet with a laser beam, and more particularly to a method of welding a galvanized steel sheet with a laser beam while preventing porosity and weld bead defects including surface craters that are formed by an evaporated gas.

BACKGROUND ART

Welding metals with beams of high energy density (heat source), typically laser beams, is used in a wide range of metal welding applications since the welding process is clean, has a high degree of freedom, and can minimize thermal strains. Particularly, the laser beam welding process for metals finds growing use in the automobile industry or the like as a composite machining system composed of a laser oscillator and a numerically controlled apparatus or robot.

Automobiles employ a number of corrosion-resistant galvanized steel sheets as a highly durable material in their frames and other components. There is a demand for welding galvanized steel sheets with a laser beam.

FIG. 2 of the accompanying drawings shows a conventional process of welding galvanized steel sheets with a laser beam. A galvanized steel sheet 1 has plated zinc layers 2, 3 deposited on its opposite surfaces, and another galvanized steel sheet 4 also has plated zinc layers 5, 6 deposited on its opposite surfaces. When a laser beam 8 is applied to the galvanized steel sheets 1, 4 to weld them, a weld bead 10 is formed as a result of a weld pass.

Steel has a melting point of about 1545° C. and a boiling point of about 2754° C., whereas zinc has a melting point of 420° C. and a boiling point of 903° C. Because of the heat produced by the high-density energy of the applied laser beam, the zinc with a lower melting point is violently evaporated into a gas, thereby forming porosity (cavities) 11a, 11b, 11c in the weld bead 10. While only the surface porosity is shown, porosity is also formed within the weld bead 10. As a result, the weld bead 10 has irregular width dimensions, and the welded joint is rendered brittle. For the reasons described above, it has been infeasible to weld galvanized steel sheets with a laser beam.

DISCLOSURE OF THE INVENTION

In view of the aforesaid drawbacks of the conventional laser beam welding method, it is an object of the present envention to provide a method of welding a galvanized steel sheet with a laser beam while preventing porosity and weld bead defects.

To solve the above problems, there is provided a method of welding galvanized steel sheets to each other or a galvanized steel sheet and a sheet of another metal to each other with a laser beam, comprising the steps of forming an intermediate layer for suppressing evaporation of zinc, between said galvanized steel sheets or said galvanized steel sheet and said sheet of another metal, and applying a laser beam to said galvanized steel sheet or said sheet of another metal, thereby welding the sheets with the laser beam.

As a consequence, zinc layers are prevented from being violently evaporated. Porosity is prevented from being formed in a weld bead, and the weld bead has a constant width.

BRIEF DESCRIPTION OF THE DRAWINGS

FIG. 1 is a fragmentary perspective view showing a method of welding galvanized steel sheets with a laser beam according to an embodiment of the present invention; and FIG. 2 is a fragmentary perspective view showing a conventional method of welding galvanized steel sheets with a laser beam.

BEST MODE FOR CARRYING OUT THE INVENTION

An embodiment of the present invention will hereinafter be described with reference to the drawings.

FIG. 1 shows a method of welding galvanized steel sheets with a laser beam according to an embodiment of the present invention. A galvanized steel sheet 1 has plated zinc layers 2, 3 deposited on its opposite surfaces, and another galvanized steel sheet 4 also has plated zinc layers 5, 6 deposited on its opposite surfaces. Each of the galvanized steel sheets 1, 4 has a thickness of 1 mm, and each of the zinc layers 2, 3, 5, 6 has a thickness ranging from about 30 to 40 μm.

An intermediate layer 7 is interposed between the galvanized steel sheets 1, 4. The intermediate layer 7 is formed by spraying a solution of carbon graphite over the galvanized steel sheet 4. Alternatively, the intermediate layer 7 may be made of a carbon-base surface absorber.

A laser beam 8 is applied to weld the galvanized steel sheets 1, 4 to each other. The laser beam 8 is produced at an output level of 2.8 KW in a continuous wave mode. The welding speed is sligtly lower than the conventional welding speed, and is specifically about 2.5 m/min.

When the galvanized steel sheets 1, 4 are welded by the laser beam 8 under the above conditions, a resulting weld bead 9 has substantially uniform width dimensions, and a porosity count, i.e., the number of cavities formed in the weld bead 9, is substantially 1/10 of the conventional porosity count. Moreover, the mechanical strength of the welded joint is not lowered.

The above welding conditions are given by way of example only, and may be modified depending on other conditions including the pressure under which the galvanized steel sheets 1, 4 are held together, the output level of the applied laser beam, and so forth.

The above method of welding galvanized steel sheets with a laser beam may be combined with a robot, and such a combination may be used as a laser beam welding robot for welding automobile body panels or the like.

While the galvanized steel sheets are welded to each other in the above description, a galvanized steel sheet and a steel sheet of another type may also be welded to each other according to the method of the present invention. The intermediate layer, which has been described as being made of carbon graphite, may be of other material. The absorber may be applied by coating.

According to the present invention, as described above, the intermediate layer which suppress evaporation of the zinc layers is interposed between the galvanized steel sheets to prevent porosity from being formed and uniformize the width of the weld bead. The mechanical strength of the welded joint is increased.

I claim:

1. A method of welding a first galvanized steel sheet to a second galvanized steel sheet or to a sheet of another metal with a laser beam, said method comprising the steps of:

forming an intermediate layer for suppressing evaporation of zinc over a zinc layer of said first galvanized steel sheet, and arranging the sheets to be welded in a welding position with said intermediate layer disposed between said galvanized steel sheets or between said galvanized steel sheet and said sheet of another metal; and applying a laser beam to the sheets in said welding position, to thereby weld the sheets together with the laser beam.

2. A method according to claim 1, wherein said intermediate layer comprises a carbon graphite layer.

3. A method according to claim 1, wherein said intermediate layer is sprayed over one of said galvanized steel sheets.

4. A method according to claim 1, wherein said sheets are welded by the laser beam at a speed lower than would be conventional in the absence of said intermediate layer.

5. A method according to claim 1, wherein said laser beam is produced in a continuous wave mode (CW).

6. A method according to claim 1, wherein said intermediate layer comprises a layer of a carbon-base surface absorber.

* * * * *